United States Patent [19]

Rogers

[11] 4,195,759
[45] Apr. 1, 1980

[54] COIL BREAKAWAY APPARATUS

[76] Inventor: John W. Rogers, 25550 Chagrin Blvd., Cleveland, Ohio 44122

[21] Appl. No.: 898,001

[22] Filed: Apr. 20, 1978

Related U.S. Application Data

[60] Continuation-in-part of Ser. No. 818,793, Jul. 25, 1977, abandoned, which is a division of Ser. No. 713,599, Aug. 12, 1976, which is a continuation-in-part of Ser. No. 648,533, Jan. 12, 1976, abandoned, which is a continuation-in-part of Ser. No. 612,275, Sep. 11, 1975, abandoned.

[51] Int. Cl.² .............................................. B26F 3/00
[52] U.S. Cl. ..................................... 225/103; 225/93
[58] Field of Search ..................... 225/103, 102, 1, 2, 225/96, 96.5, 4, 97, 93; 214/DIG. 3, 4, 1 P, 1 PA; 242/56.4, 56.1

[56] References Cited

U.S. PATENT DOCUMENTS

| 2,537,464 | 1/1951 | Holmberg | 225/97 |
| 2,740,474 | 4/1956 | Harrison | 225/93 X |
| 2,742,965 | 4/1956 | Drummond, Jr. | 225/93 X |
| 2,998,134 | 8/1961 | Gray | 225/4 X |
| 3,559,858 | 2/1971 | Osteen | 225/93 X |
| 3,904,097 | 9/1975 | Grambo, Jr. et al. | 225/103 |

Primary Examiner—Frank T. Yost
Attorney, Agent, or Firm—John F. Carney

[57] ABSTRACT

Apparatus for separating individual coils from a coil construct of wound sheet metal web material that has been partially slit along parallel lines to produce frangible parting lines between adjacent coils. The apparatus includes clamping members adapted to engage the construct on the inner and outer peripheral surfaces of the construct and on opposite sides of a parting line and means for effecting relative movement between the clamping members and a concomitant complete separation of the coil from the construct.

12 Claims, 4 Drawing Figures

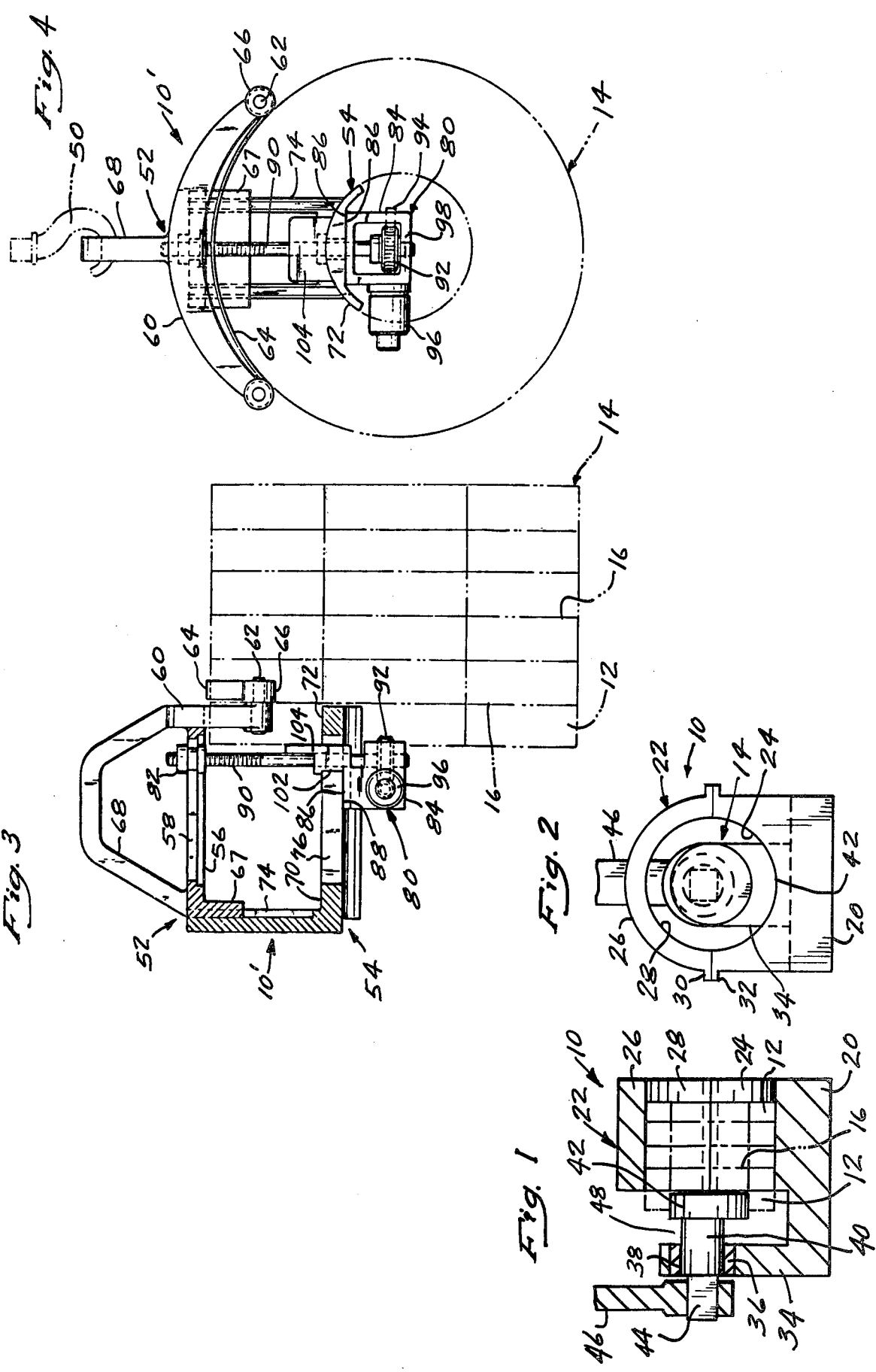

COIL BREAKAWAY APPARATUS

PRIOR APPLICATION

This application is a continuation-in-part of U.S. Pat. application Ser. No. 818,793, filed July 25, 1977 as a division of U.S. Pat. application Ser. No. 713,599, filed Aug. 12, 1976 as a continuation-in-part of U.S. Pat. application Ser. No. 648,533, filed Jan. 12, 1976 which was, in turn, a continuation-in-part of U.S. Pat. application Ser. No. 612,275, filed Sept. 11, 1975. U.S. Pat. application Ser. Nos. 612,275, 648,533 and 818,793 are now abandoned and Ser. No. 713,599, is still pending.

BACKGROUND OF THE INVENTION

In the manufacture of flat rolled metal, it is the practice to produce the web product with a greater width than is required by the end user and to subsequently slit the web into narrower strips of the desired lateral dimension. According to the practice, the metal web is coiled following rolling, after which, in a separate operation, the coiled web is placed on an uncoiler, unwound, trained through a slitting station and the so-produced strips rewound on the coiler as a number of separate coils.

An improved practice for the production of coiled strip is disclosed in U.S. Pat. application Ser. Nos. 713,599, 818,795 and 819,313, filed Aug. 12, 1976, July 25, 1977 and July 27, 1977 respectively. According to this improved practice, following rolling of the metal, the web is slit along lines parallel to its edge in a manner that produces intermittent tacks that interconnect the adjacent edges of the strips whereby, upon coiling, there results a construct containing a plurality of coils joined by a frangible connection. It is contemplated that shipment and the majority of the handling operations will be undertaken with the construct intact. Thereafter, either at the point of use or at an intermediate station, the individual strips will be severed from the construct coincident with their unwinding therefrom, as, for example, as they are fed to a press or punch.

It is desirable, in some applications, as for example, where strip is to be fed simultaneously to a number of separate process machines, to sever the respective strips from the construct as wound coil units in order to facilitate handling of the material. Although, apparatus for separating connected rolls of paper or other light sheet materials are well known such apparatus have serious size and force-producing limitations as to prevent their use on sheet metal product as contemplated in these applications where a coil construct may weigh over ten tons and be upwards of four feet in diameter and where an individual coil in the construct weighs upwards of four hundred pounds per inch of width. In these applications, moreover, forces as great as 10,000 p.s.i. are required to simultaneously fracture all of the tacks connecting an individual coil to the construct.

It is toward the provision of such apparatus, therefore, that the present invention is directed.

SUMMARY OF THE INVENTION

According to the present invention, there is provided apparatus for separating individual coils from a coil construct defined by a plurality of frangibly connected coils of wound sheet metal web material containing aligned axial openings, comprising a first member engaging the inner peripheral surface of said construct in contact with one of the coils therein; a second member engaging the outer peripheral surface of said construct in contact with an adjacent coil therein; one of said members being fixed with respect to said construct; and means for radially displacing the other of said members with respect to said one member for separating the coil engaged by the displaceable member from said construct.

According to one aspect of the invention, the coil construct may be retained in a housing enclosure with the coil to be severed axially protruding therefrom and wherein an eccentrically mounted mandrel is insertable into the axial opening in the protruding coil such that rotation of the mandrel is effective to separate the coil from the construct.

According to another aspect of the invention the apparatus may comprise opposing frame parts relatively movable toward and away from each other wherein the respective parts contain surfaces engageable with inner and outer peripheral surfaces of the construct on opposite sides of the parting line between adjacent coils whereby relative movement between the parts is effective to separate an individual coil from the construct.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1 is a somewhat schematic sectional elevational view of one form of apparatus according to the present invention;

FIG. 2 is an end view of the apparatus of FIG. 1;

FIG. 3 is an elevational view partly in section of another form of apparatus according to the present invention; and FIG. 4 is an end view of the apparatus of FIG. 3.

DESCRIPTION OF THE PREFERRED EMBODIMENTS OF THE INVENTION

In FIGS. 1 and 2 of the drawing, there is illustrated apparatus 10 operative to separate the individual coils 12 of a sheet metal coil construct 14 shown in phantom. Coil constructs of the type for which the invention is contemplated are completely described in U.S. Pat. application Ser. No. 713,599. For the purpose of the present description it need only be understood that the coils 12 that form the construct 14 are interconnected by means of frangible tacks that are intermittently spaced along the parting lines 16 between adjacent strips that form the coils and that bridge between and interconnect the edges of adjacent strips.

The coil-separating apparatus 10 comprises a body having a base 20, upstanding from one end of which is a clamp housing, indicated generally as 22, and including a semi-cylindrically formed construct receptacle 24 in its lower portion. The receptacle 24 is closed by a cover 26 having a semi-cylindrical interior surface 28 that cooperates with the receptacle 24 to define a horizontally disposed opening through the clamp housing. Elongated flanges 30 and 32 along the facing edges of the receptacle 24 and cover 26 serve to receive clamping fasteners (not shown) for securing a construct workpiece in the opening formed by the receptacle and the cover.

Upstanding from the other end of the base 20 is a bearing support standard 34 containing bearing sleeve 36 for mounting a coil displacement operator 38 for both rotational and axial movement. The operator 38 comprises a cylindrical shaft 40 that is received in the bearing sleeve 36 and a cylindrically formed mandrel 42 that is eccentrically attached to the shaft. The shaft, as shown, is of a longer axial dimension than the bearing sleeve 36 in order to enable axial retraction of mandrel 42 from a severed coil as hereinafter described. At the other end of the shaft 40 the operator is formed with a shaft extension 44 containing rectangularly disposed flats for connection to an operator drive. In the illustrated arrangement, the drive comprises a simple manually-operated lever 46 which, depending upon the degree of force necessary to fracture the coil-connecting tacks, may be sufficient for severing a coil 12 from a construct 14. Lever 46 is fixedly connected to the shaft extension 44 as by means of welding or the like and is thereby operative to impart both rotational and axial movement to the operator 38.

It will be appreciated that, where force requirements dictate otherwise, the coil displacement operator can be connected to other forms of prime movers capable of imparting rotational and axial movement thereto.

As shown in FIG. 1, the operator mandrel 42 is disposed to operate in a space 48 between the facing surfaces of the clamp housing 22 and bearing support standard. This space 48 is of sufficient longitudinal extent to accommodate the coil 12 that is to be severed from the construct 14 and axial retraction of the mandrel 42 from the coil in order to permit removal of the severed coil from the apparatus.

The operation of the described apparatus is as follows. A construct 14 of frangible interconnected coils 12 is positioned in the receptacle 24 of housing 22 and the cover 26 clamped in place to retain the construct. The clamping force imparted to the flanges 30 and 32 should not be so great as to prevent axial movement of the construct within the closed housing. The construct 14 is positioned in the housing so as to locate the endmost coil 12 within the space 48. Thereafter, the coil displacement operator 38 is axially moved to place the mandrel 42 within the central opening of the endmost coil 12 whereupon rotation of the operator will cause the coil-connecting tacks to be fractured and the engaged coil displaced from the construct. Following displacement of the coil, the operator 38 is retracted so as to withdraw the mandrel 42 from the coil and thereby permit the severed coil to be removed from the apparatus.

The construct 14 is thereafter moved within the housing 22 to locate another coil 12 in the space 48 and the operation repeated.

In FIGS. 3 and 4, there is illustrated apparatus of the type described that is particularly adapted for use on large coil constructs 14 than can be accommodated by the apparatus of FIGS. 1 and 2. This apparatus, indicated as 10', is adapted to be carried by an overhead crane 50 shown in phantom in FIG. 4 and to operate on a floor supported construct. This form of apparatus is particularly advantageous in that it has the capability of retaining the severed coil for removal and transport by the crane.

As shown, the coil separating apparatus 10' comprises a two-part split body including upper and lower parts, 52 and 54 respectively that are relatively movable with respect to one another as described hereinafter. Upper body part 52 comprises a horizontal member 56 containing an elongated opening 58 forming a slideway. At its forward end the part 52 is provided with a downwardly-facing yoke 60 that is integrally formed on the member 56. Stubs 62 are disposed at opposite ends of the yoke 60 and are adapted to retain the ends of a flexible metallic strap 64 mounted on spool-like members 66 that rotatably engage the stubs 62. As shown in the drawing, strap 64 is adapted to engage the outer peripheral surface of the coil construct 14.

The rear end of the part 52 is formed with a downwardly extending flange 66 provided on its rear face with a pair of oppositely spaced parallel slide guides that are generally T-shaped in section. Eye member 68 extends from the rear end of the part 52 to the yoke 60 forming a suspension eye for reception of a hook of crane 50 or to otherwise connect the apparatus 10' to a lifting device.

The lower part 54 is generally an L-shaped member the horizontal leg 70 of which is formed with an upwardly facing arcuate convex surface 72 adapted to engage the inner peripheral surface of a coil 12 and the other leg is formed by oppositely spaced T-slides 74 that are adapted to slide in the slide guides in the flange 66 of part 52. An elongated opening 76 forming a slideway is formed in the leg 70 in vertically aligned relation with the opening 58 in the member 56 of part 52. As shown in FIG. 3, the end of the leg 70 of part 54 is longitudinally spaced from the strap 64 in order that when the former engages the interior of a coil 12 the latter will bear on the exterior of the construct 14 on the opposite side of a parting line 16.

A displacing mechanism, indicated generally as 80, interconnects the two body parts 52 and 54 and is operative to displace the parts with respect to one another. The mechanism 80 comprises a threaded nut 82 slidably captive in the slideway opening 58 of the upper part 52 and a hollow, frame-like body 84 slidably received in the slideway opening 76 of the part 54. The body 84 contains an upper bearing surface 86 adapted to engage a slide surface 88 formed on the underside of the leg 70. A shaft 90, threaded at one end for connection with the nut 82 is journaled for rotation in the body. The lower end of the shaft 90 contains a pinion 92 that is fixed thereto and which engages a drive worm 94 operated by an electric motor 96 on the body 84.

As shown in FIG. 3 the shaft 90 is journalled for rotation in the body 84 at two vertically spaced locations defined by an opening in the lower body side 98 and the interior of an upper body extension 102. Body extension 102 is further formed with a bearing flange 104 adapted to abut the end of coil construct 14 in order to dispose the apparatus 10' in its operative position for severing a coil 12.

In operation, the apparatus 10', suspended, for example, from crane hook 50, is moved into position with respect to a floor-supported coil construct 14 and the horizontal leg 70 of the part 54 inserted into the axial opening in the construct. The displacing mechanism is moved along the slideway openings 58 and 76 to a position in which the surface of bearing flange 10 and engages the end of the construct and the end of the leg 70 and the strap 64 are disposed on opposite sides of the parting line 16 to be fractured. Once the apparatus 10' is in position motor 96 is actuated which causes parts 52 and 54 to be drawn toward each other by rotation of the shaft 90 thereby imparting a resultant upward force on the endmost coil 12 shown in FIG. 3. The force generated by the motor is sufficient to fracture the coil-connecting tacks whereupon the coil 12 is severed from the construct.

Following severence of the coil 12 and with the apparatus 10' still secured thereto, the lifting device can conveniently lift the severed coil and deliver it to its point of use. Actuation of the motor 96 in the reverse direction effects release of the coil 12 from the apparatus 10'.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for separating individual coils from a wound construct of sheet metal web material having an axial opening therethrough and containing a plurality of axially spaced coils separated by parting lines having intermittently spaced frangible connections interconnecting said coils, said apparatus comprising:
   a first member having an operative surface conforming generally to that of the construct opening;
   a second member having an operative surface conforming generally to that of the external surface of the construct;
   the operative surfaces of said first and second members being disposed in facing, axially spaced relation to one another whereby the operative surface of said first member is engageable with the inner peripheral surface of the coil to be removed and the operative surface of said second member is engageable with the outer peripheral surface of the next adjacent construct coil;
   means for fixing the operative surface of said second member with respect to said construct; and
   means for radially displacing the operative surface of said first member with respect to that of said second member.

2. Apparatus as recited in claim 1 in which said second member comprises a housing for receiving and enclosing the engaged coils of said construct and said first member comprises a mandrel capable of imparting radial force insertable into the axial opening of the coil to be removed from said construct.

3. Apparatus as recited in claim 2 in which said displacing means comprises a drive member mounted in journal means for rotation with respect to said construct, said mandrel being eccentrically mounted to said drive member.

4. Apparatus as recited in claim 3 in which said journal means include a journal support longitudinally spaced from the facing end of said housing by an amount sufficient to accommodate a coil to be severed from said construct, and said mandrel being operably disposed in said space.

5. Apparatus as recited in claim 4 in which said mandrel is axially retractable from said coil.

6. Apparatus as recited in claim 1 in which said first and second members form the relatively movable upper and lower parts of a frame, and said displacing means being adjustably retained between said parts.

7. Apparatus as recited in claim 6 in which said upper and lower frame parts contain vertically aligned slideways and said displacing means comprises:
   (a) a body;
   (b) means for slidably retaining said body in one of said slideways;
   (c) a nut slidably retained in the other of said slideways;
   (d) a rotatable threaded shaft connecting said body to said nut; and
   (e) means mounted in said body for rotating said shaft.

8. Apparatus as recited in claim 7 in which said body includes abutment means for positioning said displacing means with respect to said construct.

9. Apparatus as recited in claim 7 in which said lower frame part contains an arcuate convex surface adapted to engage the inner peripheral surface of the coil of said construct to be separated and said upper frame part contains an arcuate, concave surface adapted to engage the outer peripheral surface of said construct longitudinally spaced from the coil to be separated.

10. Apparatus as recited in claim 9 in which said upper frame part includes a yolk, stubs disposed at the extremities of said yolk and said arcuate concave surface is defined by a flexible strap connected between said stubs.

11. Apparatus as recited in claim 6 in which said upper and lower frame parts include means for retaining said parts for guided vertical sliding movement.

12. Apparatus as recited in claim 6 in which said frame includes means for connecting the same to lifting means for removing the separating coil from said construct.

* * * * *